(12) United States Patent
Iwase

(10) Patent No.: US 7,909,519 B2
(45) Date of Patent: Mar. 22, 2011

(54) SINGLE-LENS REFLEX CAMERA INCLUDING MIRROR DRIVING DEVICE

(75) Inventor: Shigeru Iwase, Akishima (JP)

(73) Assignee: Olympus Imaging Corp., Tokyo (JP)

( * ) Notice: Subject to any disclaimer, the term of this patent is extended or adjusted under 35 U.S.C. 154(b) by 193 days.

(21) Appl. No.: 12/250,313

(22) Filed: Oct. 13, 2008

(65) Prior Publication Data
US 2009/0097839 A1 Apr. 16, 2009

(30) Foreign Application Priority Data

Oct. 16, 2007 (JP) ................................. 2007-269534

(51) Int. Cl.
*G03B 19/12* (2006.01)
(52) U.S. Cl. .......................... 396/358; 396/502; 348/374
(58) Field of Classification Search .................. 396/502, 396/358; 348/374
See application file for complete search history.

(56) References Cited

U.S. PATENT DOCUMENTS

| 5,892,990 A * | 4/1999 | Ogi ................................. 396/89 |
| 2005/0238346 A1 * | 10/2005 | Uematsu et al. .............. 396/447 |
| 2005/0276598 A1 * | 12/2005 | Tomatsu ........................ 396/357 |

FOREIGN PATENT DOCUMENTS

JP 01-202738 8/1989

* cited by examiner

*Primary Examiner* — Christopher E Mahoney
*Assistant Examiner* — Fang-Chi Chang
(74) *Attorney, Agent, or Firm* — Straub & Pokotylo; John C. Pokotylo

(57) ABSTRACT

A single-lens reflex camera including a mirror driving device comprises: a mirror; a first biasing spring that biases the mirror downward; a drive lever for performing charge drive and a mirror drive; a second biasing spring that biases the drive lever in a mirror up direction; a locking lever that swings around a pivoting shaft on the drive lever; a mirror up and down lever engaged with the locking lever, the mirror up and down lever pivoting with the drive lever to raise the mirror by the second biasing spring against the first biasing spring, the mirror up and down lever releasing the engagement with the locking lever, and the mirror up and down lever pivoting in a direction opposite the direction during the mirror up by the first biasing spring to thereby lower the mirror; a locking spring that engages and biases the locking lever to the mirror up and down lever; and a charge gear that includes a charge abutment that pivots the drive lever in a charge direction against the second biasing spring and a release abutment that releases the engagement between the locking lever and the mirror up and down lever.

7 Claims, 11 Drawing Sheets

SINGLE-LENS REFLEX CAMERA INCLUDING MIRROR DRIVING DEVICE

CROSS REFERENCE TO RELATED APPLICATION

This application claims the benefit of Japanese Application No. 2007-269534 filed in Japan on Oct. 16, 2007, the contents of which are incorporated herein by this reference.

BACKGROUND OF THE INVENTION

1. Field of the Invention

The present invention relates to a single-lens reflex camera including a mirror driving device, and more particularly, to a single-lens reflex camera including a mirror driving device capable of performing a mirror drive and a shutter charge drive with one drive motor.

2. Description of the Related Art

Conventionally, a so-called digital camera as a photographing device has been widely used in which an image pickup device photoelectrically converts an optical image of a subject entered through a taking lens to acquire a data file indicative of an electronic image. Various digital cameras are generally in practical use, such as a compact type including a normal lens shutter and a single-lens reflex type including a quick return mirror as a mirror device, a focal plane shutter device, and the like.

Among these, the mirror device mounted on the single-lens reflex digital camera (hereinafter, "single-lens reflex camera") is constituted by: a reflective mirror arranged displaceably between a state for guiding a subject beam, which enters after penetrating through a taking lens arranged on the optical path of the taking lens, to a finder device as an observation optical system and a state for guiding a subject beam, which enters after retracting from the optical path of a taking lens and penetrating through the taking lens, to an image pickup device (mirror up state as a retracted state); a mirror driving device that appropriately places the reflective mirror on the optical path at required timing or that performs a drive control for retracting from the optical path; and the like.

A general single-lens reflex camera can perform a series of mechanical operations (one action) in a series of taking operations using a mirror driving device, the operations including an operation of appropriately displacing a position of a reflective mirror with respect to the optical path at required timing and a shutter charge operation as well as a shutter release operation of a shutter device. A small motor is usually used as a power source of the mirror driving device.

For example, in a camera disclosed in Japanese Patent Application Laid-Open Publication No. 1-202738, one drive motor drives a plurality of mechanisms, i.e. a charge mechanism of a shutter device, a displacement mechanism of a movable mirror, and a film feeding mechanism.

SUMMARY OF THE INVENTION

A single-lens reflex camera including a mirror driving device according to the present invention comprises: a movable reflective mirror; a first biasing spring that provides pivot and bias for lowering the movable reflective mirror; a drive lever arranged parallel to a side plate of a mirror box and arranged reciprocably pivotable along the side plate to perform a shutter charge drive and an up and down drive of the movable reflective mirror; a second biasing spring that pivots and biases the drive lever in a direction in which the movable reflective mirror goes up; a locking lever arranged parallel to the side plate and swingable with a pivoting shaft as the pivot center, the pivoting shaft being arranged on the drive lever; a mirror up and down lever arranged parallel to the side plate, arranged reciprocably pivotable along with the pivot of the drive lever, engaged with the locking lever when raising the movable reflective mirror, the mirror up and down lever pivoting with the drive lever to raise the movable reflective mirror with the biasing force of the second biasing spring against the biasing force of the first biasing spring, the mirror tip and down lever releasing the engagement with the locking lever when lowering the movable reflective mirror, and the mirror up and down lever pivoting in the direction opposite the pivot direction of when raising the movable reflective mirror with the biasing force of the first biasing spring to lower the movable reflective mirror; a locking spring that biases in a direction in which the locking lever engages with the mirror up and down lever; and a charge gear that includes a charge abutment for pivoting the drive lever in the shutter charge direction while maintaining the down state of the movable reflective mirror against the biasing force of the second biasing spring and a release abutment for releasing the engagement between the locking lever and the mirror up and down lever and that pivots parallel to the side plate.

Benefits of the present invention will be more apparent from the following detailed description.

DETAILED DESCRIPTION OF THE PREFERRED EMBODIMENTS

Figure 1:
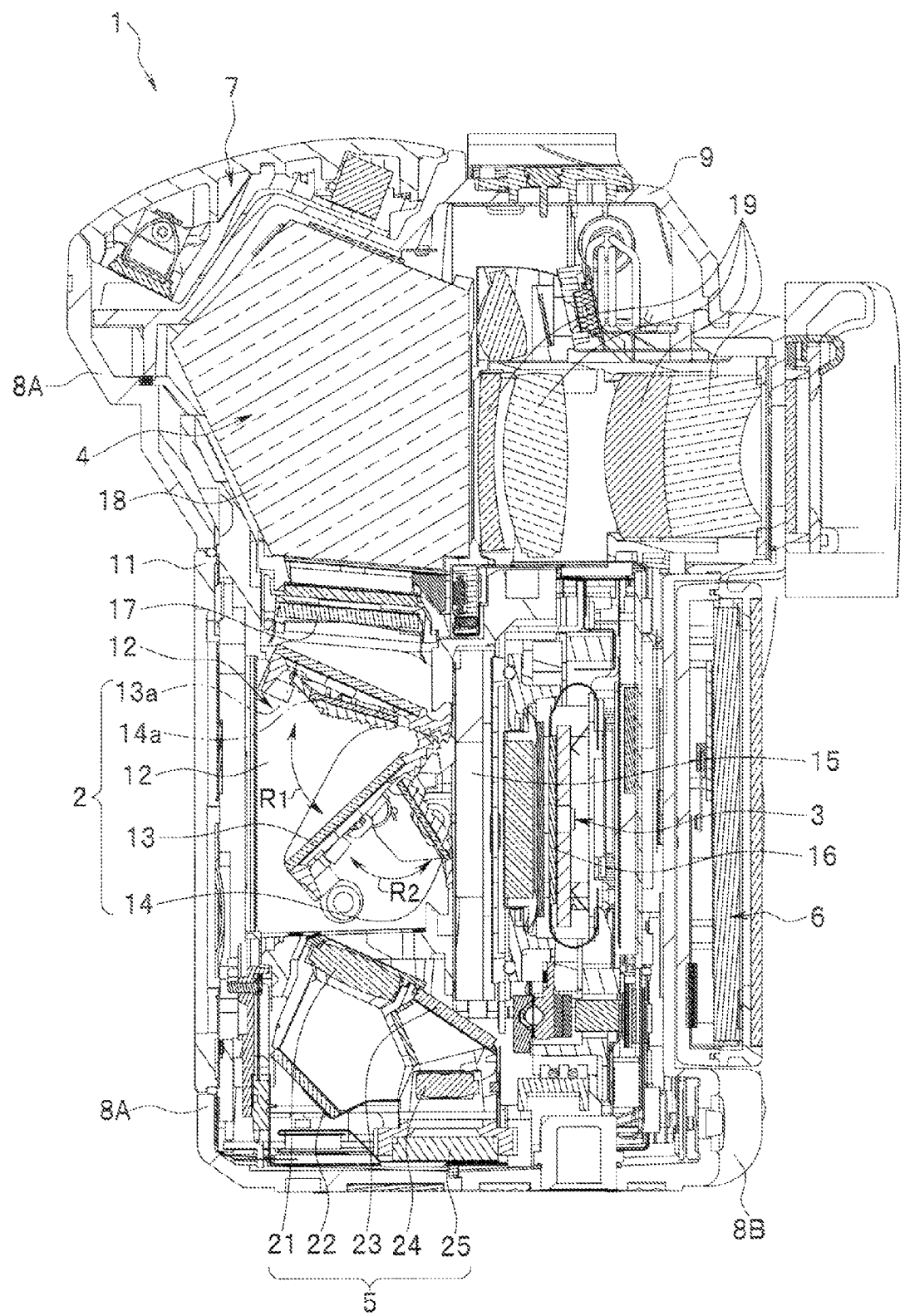
FIG. 1 is a longitudinal sectional view of an internal configuration of a single-lens reflex camera of an embodiment of the present invention.

The present invention will be described with reference to the illustrated embodiments.

A schematic configuration of a single-lens reflex camera of the present embodiment will be described first with reference to FIGS. 1 and 2.

A camera case of a single-lens reflex camera (hereinafter, simply "camera") 1 of the present embodiment is formed of exterior members such as a front cover 8A that covers a front surface and part of a bottom surface, a back cover 8B that covers a back surface and part of a bottom surface, and an upper cover 9 that covers an upper surface.

Inside the camera case, various constituent units are arranged at predetermined positions respectively, the constituent units including a mirror box 12 in which a mirror device 2 is mounted, an image pickup unit 3 constituted by an image pickup device 16 and the like, a finder unit 4 that constitutes an observation optical system, a distance measuring unit 5, a display unit 6, a stroboscopic unit 7, a shutter device 15, a battery 26 as a driving source of the present camera 1, and the like.

A body mount (camera mount) 11 is arranged on the front side of the mirror box 12. The body mount 11 is a connection member that makes a taking lens (not specifically shown) removable.

In the description below, "optical path" denotes an optical path of a subject beam that enters through a taking lens when the taking lens is mounted on the body mount 11. An exception will be clearly stated if there is an exception.

The mirror box 12 is arranged on the backside of the optical path of the body mount 11, and a main mirror 13, a sub mirror 14, and the like that are movable reflective mirrors constituting the mirror device 2 are arranged inside the mirror box 12. As shown in FIG. 2, a drive motor 20 as a driving source for performing an up drive, a down drive, and a shutter charge drive of mirrors 13 and 14 of the mirror device 2 and a mirror driving and shutter charging device (hereinafter, abbreviated as "mirror driving device") 10 that includes a power transmission mechanism and the like for transmitting the driving force of the drive motor 20 to the mirror device 2 and the shutter device 15 are arranged on one side of an outer wall of the mirror box 12 (right side facing the front of the camera 1 in the present embodiment). The mirror driving device 10 is not illustrated in FIG. 1, and therefore, see FIG. 2 and the like. A detailed configuration of the mirror driving device 10 will be described below (see FIGS. 3 to 6).

One edge of the main mirror 13 in the mirror device 2 is pivotally supported by a fixed portion inside the mirror box 12. With this arrangement, the main mirror 13 pivots within a predetermined range in an arrow R1 direction of FIG. 1. At least part of the reflective surface of the main mirror 13 is configured as a semi-transmissive portion.

Meanwhile, one edge of the sub mirror 14 in the mirror device 2 is pivotally supported with respect to the back side of the main mirror 13. With this arrangement, the sub mirror 14 pivots within a predetermined range in an arrow R2 direction of FIG. 1. The sub mirror 14 is constituted by a total reflection surface.

Figure 2:
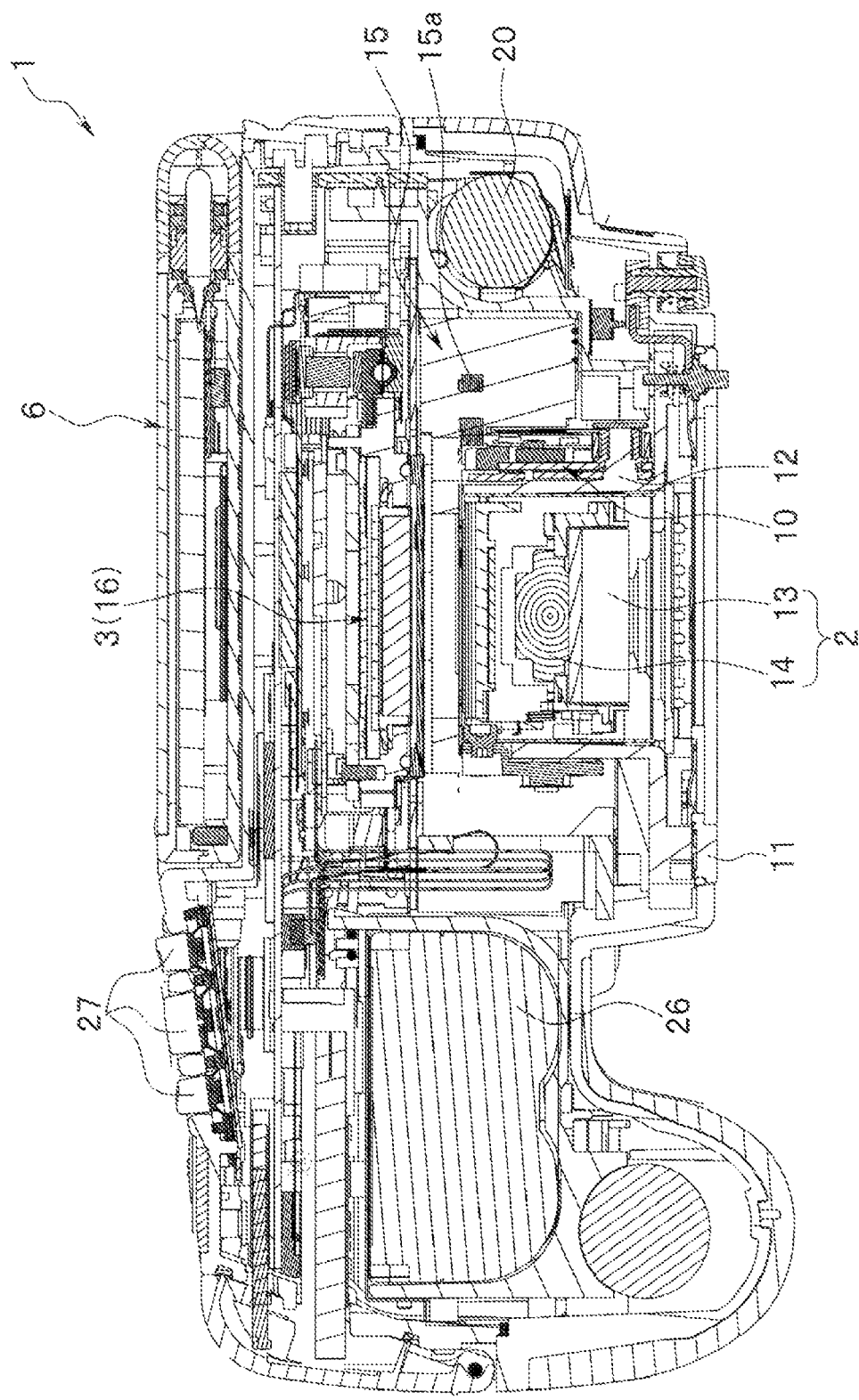
FIG. 2 is a transverse sectional view of an internal configuration of the single-lens reflex camera of the embodiment of the present invention.
Figure 3:
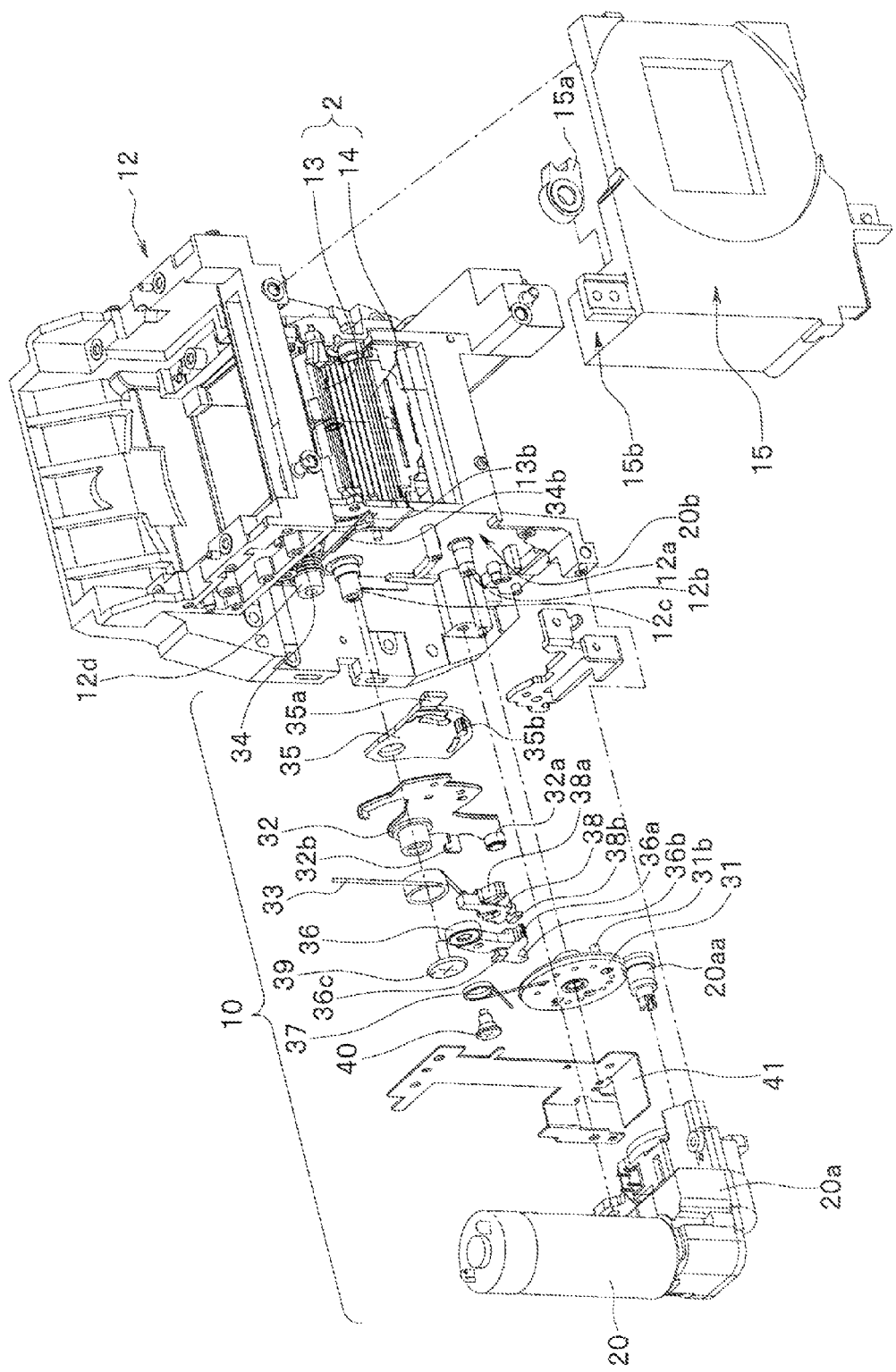
FIG. 3 is a main-part exploded perspective view in which part (a mirror driving and shutter charging device, a mirror box, and a shutter device) of the constituent units of the single-lens reflex camera of the present embodiment is extracted, enlarged, and exploded.
Figure 4:
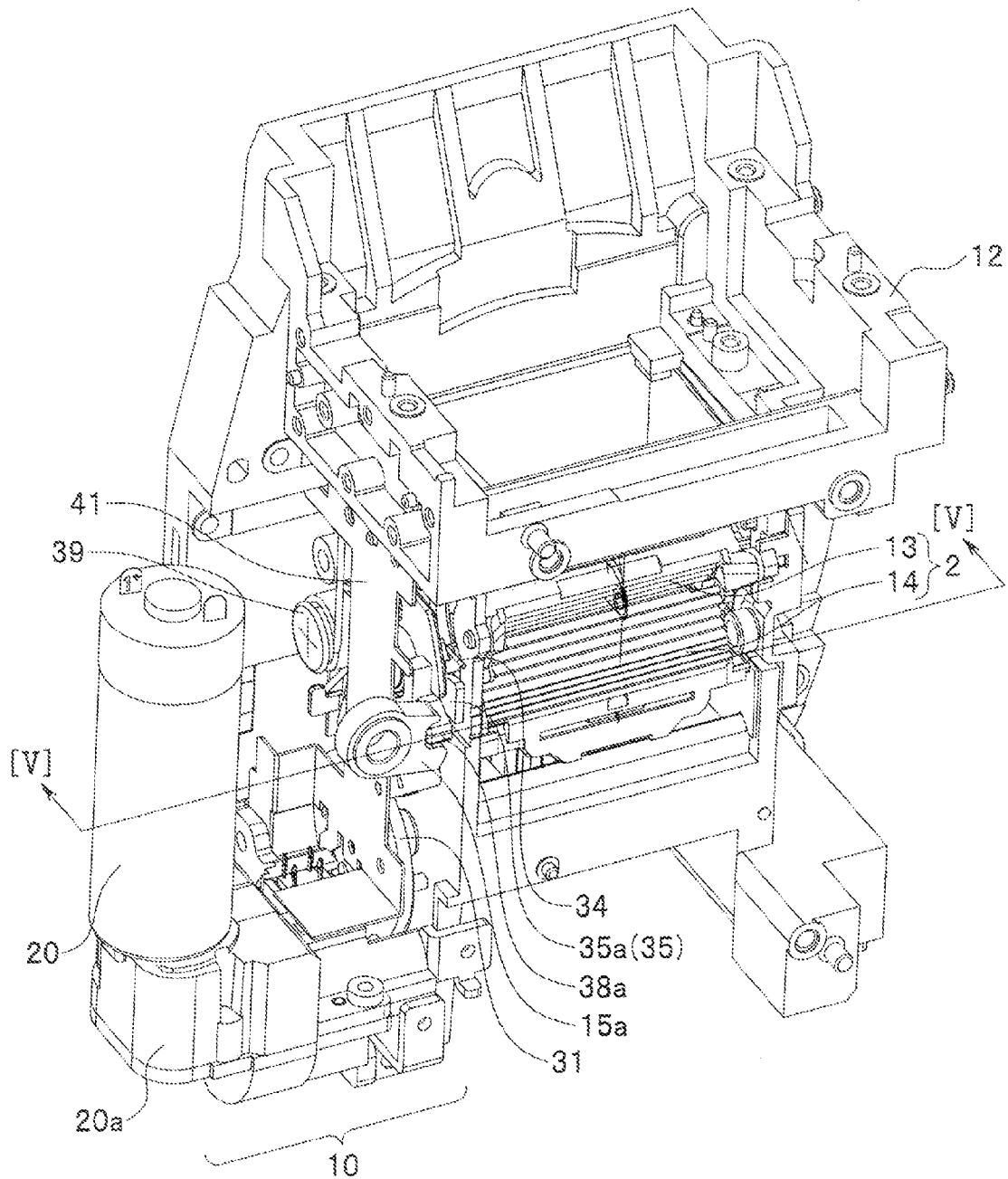
FIG. 4 is a main-part enlarged perspective view showing a state in which the constituent units of FIG. 3 are assembled.
Figure 5:
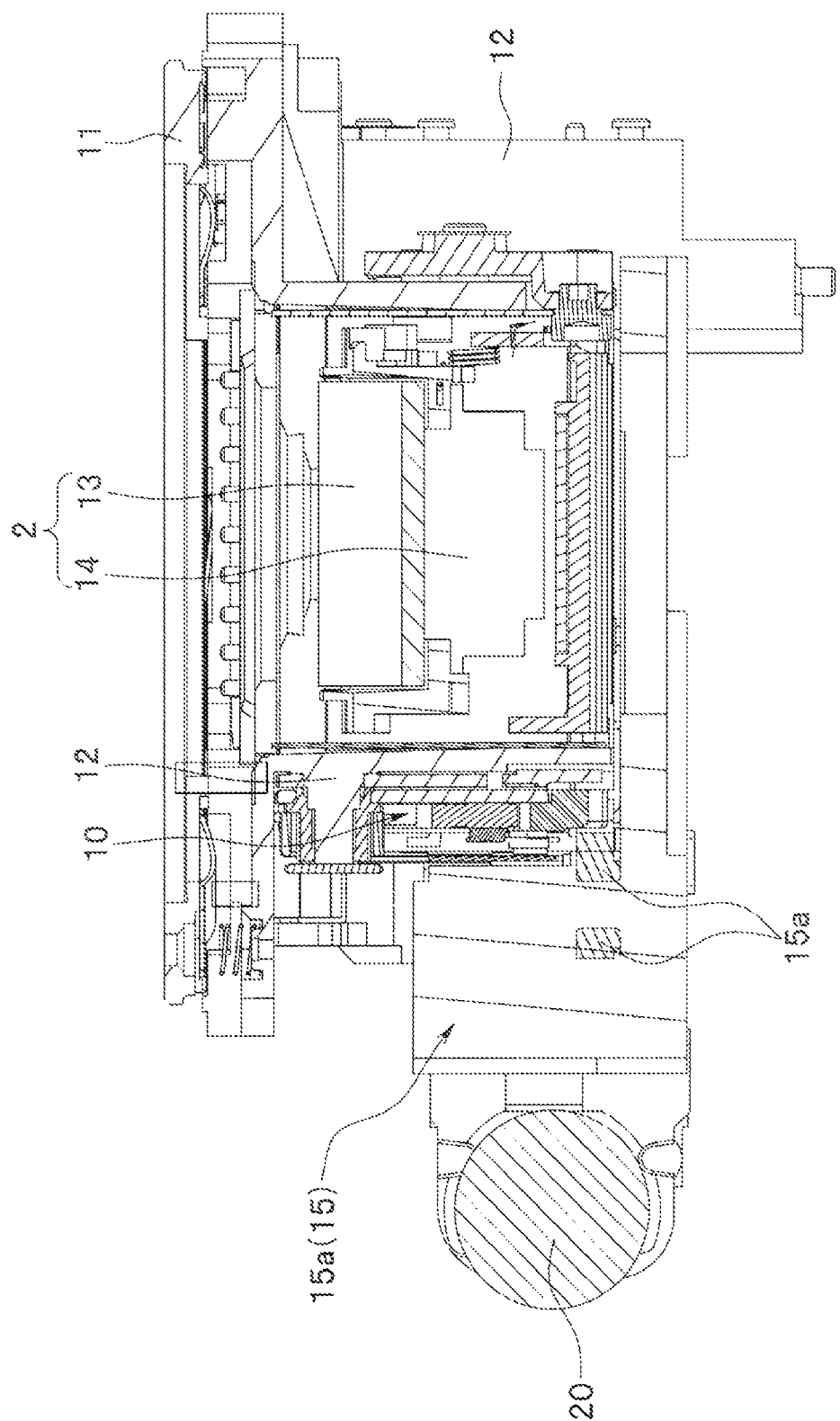
FIG. 5 is a sectional view along a line [V]-[V] of FIG. 4.
Figure 6:
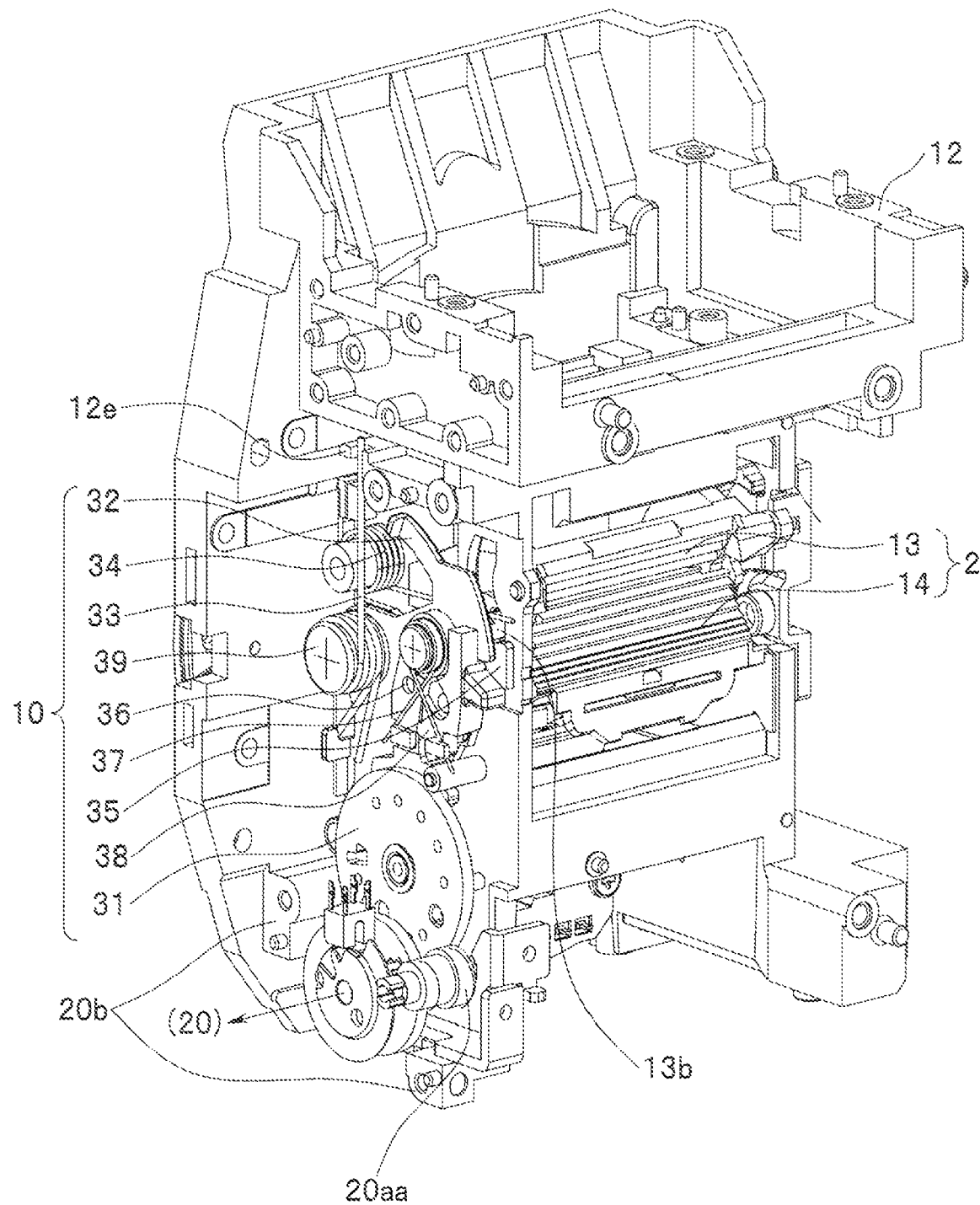
FIG. 6 is a main-part enlarged perspective view showing a state in which part of the constituent members (part of the mirror driving and shutter charging device and the shutter device) is further removed from the part of the constituent units of FIG. 3.

The main mirror 13 and the sub mirror 14 that constitute the mirror device 2 are displaceably arranged between observation positions (reference numerals 13 and 14) shown with solid lines in FIG. 1 and retraction positions (reference numerals 13a and 14a) shown with two-dot chain lines in FIG. 1.

More specifically, when the mirrors 13 and 14 of the mirror device 2 are at observation positions, the main mirror 13 is inclined at about 45 degrees against the optical path of a subject beam that penetrates through a taking lens from the subject and that enters in the mirror box 12 and is positioned on the optical path, while the sub mirror 14 is inclined at a predetermined angle against the main mirror 13.

With this arrangement, the main mirror 13 reflects the subject beam, which has entered after penetrating through the taking lens from the subject, with a reflective surface. The main mirror 13 then bends the optical path, guides the subject beam to the finder unit 4, and causes part of the subject beam to penetrate through a semi-transmissive portion and travel straight to the sub mirror 14. The sub mirror 14 reflects the subject beam, which has penetrated through the semi-transmissive portion of the main mirror 13 and traveled straight, with a reflective surface. The sub mirror 14 then bends the optical path and guides the subject beam to the distance measuring unit 5.

Meanwhile, when the mirrors 13 and 14 of the mirror device 2 are at the retraction positions, a subject beam that penetrates through the taking lens from the subject and that enters the mirror box 12 is designed to travel straight and be guided to the image pickup unit 3 arranged on the backside of the mirror box 12.

The shutter device 15 constituted by a shutter mechanism for controlling the transit time of the subject beam, a shutter controlling mechanism for controlling opening and closing of the shutter mechanism, and the like is arranged on the backside of the mirror box 12. When the shutter of the shutter device 15 is opened, an incident subject beam is directed to a light receiving surface of the image pickup device 16 of the image pickup unit 3 that is arranged further back. In the camera 1 of the present embodiment, the shutter device 15 is a shutter device including, for example, a focal plane shutter curtain and is a unit including a shutter controlling mechanism 15b and the like for driving the shutter curtain (not specifically shown, see FIG. 3 and the like described below).

As described, the image pickup unit 3 is arranged on the backside of the shutter device 15. The image pickup unit 3 is constituted by the image pickup device 16, an electric board mounted with a circuit and the like for applying various image processing in relation to an image signal acquired by the image pickup device 16, and the like.

The finder unit 4 that constitutes the observation optical system is arranged on the upper side of the mirror box 12. The finder unit 4 is arranged on the optical path of the subject beam reflected by the main mirror 13 with the mirrors 13 and 14 of the mirror device 2 at the observation positions, and a focusing screen 17 of the finder unit 4 is arranged at a position optically equivalent to the image pickup device 16 with respect to the taking lens.

The finder unit 4 is constituted by a focusing screen 17 designed to form an image of the subject, a pentaprism 18 for converting the image of the subject formed in the focusing screen 17 to an erect image, an ocular optical system 19 for enlarging an optical image from the pentaprism 18 and guiding the optical image to the eyes of an observer, and the like.

A stroboscopic unit 7 as a flash light emitting device for directing auxiliary illumination light to the subject is arranged on the upper side of the finder unit 4. The stroboscopic unit 7 is designed to pop up when used and to be freely projected and retracted so as to be able to be housed inside the camera 1 when not used.

The distance measuring unit 5 as a focus detecting device in a phase difference detecting method is arranged on the bottom side of the mirror box 12. The distance measuring unit 5 is arranged on the optical path of the subject beam, which has penetrated through the semi-transmissive portion of the main mirror 13 with the mirrors 13 and 14 of the mirror device 2 at the observation positions and reflected by the sub mirror 14.

The distance measuring unit 5 is constituted by a condenser lens 21 that condenses incident light, a first mirror 22, a second mirror 23, a separator lens 24, a distance measuring sensor 25, and the like.

The display unit 6 including a color liquid crystal display device and the like, various operation members 27 (see FIG. 2), and the like are arranged on the back side of the camera 1.

A configuration of the circumference of the mirror box 12 in the camera 1 of the present embodiment, especially a detailed configuration of the mirror driving device, will now be described with reference to FIGS. 3 to 6.

As described, the mirror driving device 10 is arranged on one side (right side) of the outer wall of the mirror box 12. The mirror driving device 10 includes: a drive motor 20 as a driving source for an up or down drive of the main mirror 13 and the sub mirror 14 of the mirror device 2 and for a shutter charge drive of the shutter device 15; a power transmission mechanism for transmitting the driving force of the drive motor 20 to the mirror device 2 or the shutter device 15; and the like. Thus, the present camera 1 is designed to be able to perform an up and down drive of the mirrors 13 and 14 of the mirror device 2 and a shutter charge drive of the shutter device 15 with a series of operations using the driving force of one drive motor 20.

Therefore, the power transmission mechanism in the mirror driving device 10 comprises a gear box 20a, an output gear 20aa, a charge gear 31, a drive lever 32, a mirror up spring 33 as a second biasing spring, a mirror down spring 34 as a first biasing spring, a mirror up and down lever 35, a mirror hook lever 36 as a locking lever, a hook lever locking spring 37, a shutter charge lever 38, and the like.

The gear box 20a is a unit constituted by a plurality of gears and the like. The gear box 20a plays a role to decelerate the driving force of the drive motor 20 and to convert an output direction of the drive motor 20.

The output gear 20aa is connected to the gear box 20a, and the output gear 20aa is designed to extract a drive output of the drive motor 20.

The drive motor 20 and the gear box 20a are connected and unitized, and the unit is fixed to and supported by, with a connection member such as a screw, a gear box support board 20b attached to a predetermined part of the outer face of a side plate 12a of the mirror box 12. In the present embodiment, the drive motor 20 is arranged at a position outside the shutter controlling mechanism 15b of the shutter device 15.

A support shaft 12b implanted in the side plate 12a of the mirror box 12 supports the charge gear 31 in a freely pivotable way. The charge gear 31 includes a gear portion engaged with the output gear 20aa on the periphery. Thus, the output gear 20aa is engaged with the gear portion of the charge gear 31 to transmit the driving force of the drive motor 20 to the charge gear 31. In this case, the drive motor 20 pivots in one direction only. Therefore, the charge gear 31 also pivots only in one direction (counterclockwise as seen from the side of the mirror box 12 in the present embodiment).

A cam 31a (not shown in FIGS. 3 to 6, see FIG. 7 and the like) that is thick in the pivoting shaft direction of the charge gear 31 and that radially and continuously changes the dimension is formed on one side of the charge gear 31, i.e., on the opposing surface of the wall of the side plate 12a with the charge gear 31 being attached to the side plate 12a of the mirror box 12. A hook release boss 31b extending in the pivoting shaft direction of the charge gear 31 apart from the cam 31a is formed on the one side where the cam 31a of the charge gear 31 is formed. The cam 31a is formed in a predetermined shape for acting on the drive lever 32 that is a lever member serving as a fundamental configuration section of the present mirror driving device 10 and that performs a mirror drive and a charge drive to realize the drive in desired timing of the mirror device 2 and the shutter device 15 as described below.

The maximum diameter of cam of the cam 31a reaches near the bottom. The hook release boss 31b is also set up near the bottom of the gear of the charge gear 31. The cam 31a and the hook release boss 31b are formed with substantially the same thickness and the height in the pivoting shaft direction of the charge gear 31. A cam follower 32a described below is formed to pass through between the cam 31a and the hook release boss 31b.

Simply stating, the cam 31a functions as a charge abutment that pivots the drive lever 32 in the shutter charge direction against the biasing force of the mirror up spring 33 while maintaining the down state of the main mirror 13, and the specific description will be stated below. The hook release boss 31b functions as a release abutment that releases the engagement between the mirror hook lever 36 and the mirror up and down lever 35.

The cam follower 32a of the drive lever 32 abuts the cam 31a of the charge gear 31. The drive lever 32 is a member installed for the shutter charge drive and the mirror up and down drive of the main mirror 13. The drive lever 32 is arranged parallel to the side plate 12a of the mirror box 12 and is supported by another support shaft 12c as a pivoting shaft implanted in the side plate 12a so as to be reciprocably pivotable along the side plate 12a.

The mirror up and down lever 35 for pivoting the main mirror 13 in the up direction is reciprocably and pivotally supported between the drive lever 32 and the side plate 12a on the support shaft 12c. The mirror up spring 33 as a second biasing spring for pivoting and biasing the drive lever 32 in a predetermined direction (direction for raising the main mirror 13) is wound around the support shaft 12c on the outside surface of the drive lever 32.

A screw 39 restricts the movement in the axial direction of the mirror up spring 33, the drive lever 32, and the mirror up and down lever 35 to avoid dropping off.

As the charge gear 31 pivots in a predetermined direction, the cam follower 32a of the drive lever 32 moves along the cam surface of the cam 31a, and the drive lever 32 is controlled to pivot at predetermined timing with the support shaft 12c as the pivot center.

As described, the mirror up spring 33 is wound around the support shaft 12c. One end of the mirror up spring 33 is locked to the locking portion 32b of the drive lever 32, and the other end is locked to the fixed portion 12e of the side plate 12a of the mirror box 12. Therefore, the mirror up spring 33 pivots and biases the drive lever 32 counterclockwise with the support shaft 12c as the pivot center as seen from the direction facing the side plate 12a.

A fixed pin 40 serving as a pivoting shaft is set and fixed on the drive lever 32 at a predetermined position different from the support shaft center. The fixed pin 40 swingably supports the mirror hook lever 36 as a locking lever for maintaining and releasing the up state of the main mirror 13, with the fixed pin 40 as the pivot center.

The hook lever locking spring 37 as a locking spring for pivoting and biasing the mirror hook lever 36 in a predetermined direction (direction for engaging with the mirror up and down lever 35) is wound around the fixed pin 40. One end of the hook lever locking spring 37 is locked to the locking portion 36c.

The mirror hook lever 36 includes: a hook portion 36a that pivots the mirror up and down lever 35 in predetermined directions by engaging with or releasing the engagement from the locking boss 35b of the mirror up and down lever 35; and a cam follower 36b that appropriately abuts with the cam 31a and the hook release boss 31b of the charge gear 31.

Meanwhile, the shutter charge lever 38 is set and fixed to the drive lever 32 by connection means such as a screw so as to integrate with the drive lever 32. The shutter charge lever 38 includes: a convex-shaped shutter charge portion 38a that performs a shutter charge drive by acting on the shutter set lever 15a that sets the shutter of the shutter device 15 pivotally installed at a predetermined part of the shutter device 15; and a locking portion 38b that locks the other end of the hook lever locking spring 37. The shutter charge portion 38a presses the shutter set lever 15a of the shutter device 15 at predetermined timing to perform the shutter charge drive of the shutter device 15. The hook lever locking spring 37 pivots and biases the mirror hook lever 36 counterclockwise with the fixed pin 40 as the pivot center as seen from the direction facing the side plate 12a.

The mirror down spring 34 as a first biasing spring for providing pivot and bias for biasing the main mirror 13 in a predetermined down direction is wound around another support shaft 12d of the side plate 12a. One end of the mirror down spring 34 is locked to a fixed portion 12f of the side plate 12a of the mirror box 12 (see especially FIG. 7 and the like), and the other end is locked to a mirror driving rod 13b formed to extend from the main mirror 13 to the side plate 12a of the mirror box 12 and protrude outside the side of the mirror box 12 through a hole of the side plate 12a. The mirror driving rod 13b abuts a lever portion 35a of the mirror up and down lever 35. Therefore, the mirror down spring 34 pivots and biases the main mirror 13 in the down direction by engaging with the mirror driving rod 13b and biases the main mirror 13 through the mirror driving rod 13b so that the mirror up and down lever 35 pivots clockwise with the support shaft 12c as the pivot center as seen from the side facing the side plate 12a.

A thin holding plate 41 is arranged outside the constituent members of the power transmission mechanism in the present mirror driving device 10 to cover the constituent members. The holding plate 41 is fixed to a fixed portion of the side plate 12a of the mirror box 12 by fixing means such as a screw clamp. In this case, the holding plate 41 is arranged to cover the outer faces of the constituent members while avoiding to inhibit operation of the power transmission mechanism and ensuring reliable operation. In this way, the holding plate 41 plays a role to restrict the constituent members of the power transmission mechanism, especially the charge gear 31, the drive lever 32, the mirror hook lever 36, the shutter charge lever 38 from dropping off in a direction along the spindles that support the members, i.e., the direction orthogonal to the side plate 12a of the mirror box 12.

An operation of the mirror driving device 10 in the camera 1 of the present embodiment configured in such a way will be described with reference to FIGS. 7 to 11.

The main mirror 13 and the sub mirror 14 of the mirror device 2 are at the observation positions (reference numerals 13 and 14) shown with solid lines of FIG. 1 when the present camera 1 is in a normal state. The state of the mirror device 2 at this point will be called a mirror down state.

The main mirror 13 in the mirror down state reflects, with the reflective surface, the subject beam entered from the subject that has entered after penetrating through the taking lens from the subject and guides the subject beam to the finder unit 4. This enables the user to observe an image of the subject using the finder unit 4. In this case, part of the subject beam penetrates through the semi-transmissive portion of the main mirror 13 and travels straight to be directed on the sub mirror 14. Receiving the part of the subject beam, the sub mirror 14 reflects the subject beam with the reflective surface and guides the subject beam to the distance measuring unit 5. In this way, when the user performs a predetermined operation for performing a distance measuring operation in the mirror down state, a control circuit (not specifically shown) receives an operation instruction signal and controls the drive of the distance measuring unit 5. As a result, a predetermined distance measuring operation by the distance measuring unit 5 is executed.

When the mirror device 2 of the present camera 1 is in the mirror down state, the shutter controlling mechanism of the shutter device 15 is in a state in which the shutter charge is completed.

Figure 7:
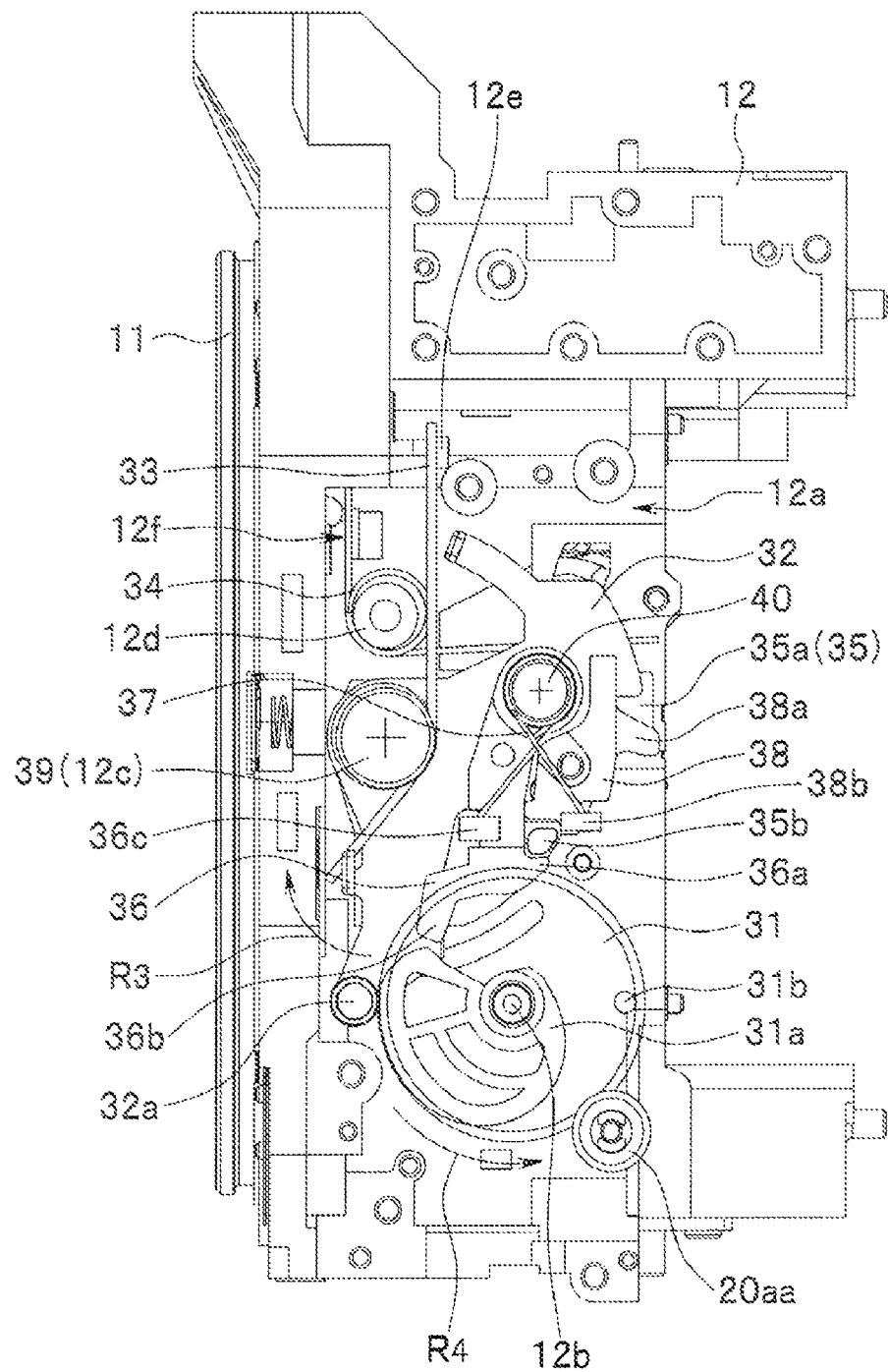
FIG. 7 is a plan view showing an operation of the mirror driving (and shutter charging) device of the single-lens reflex camera of the present embodiment and showing a state just before a mirror up operation by the mirror driving device.

The states of the constituent members of the power transmission mechanism in the mirror driving device 10 in the mirror down state are as shown in FIG. 7.

More specifically, the cam follower 32a of the drive lever 32 abuts the cam surface of the cam 31a of the charge gear 31 in the mirror down state of FIG. 7. At this point, the cam follower 32a is pressed by the cam 31a in the direction along an arrow R3 of FIG. 7. Therefore, the drive lever 32 is biased clockwise in FIG. 7 against the biasing force of the mirror up spring 33 with the support shaft 12c as the pivot center.

At the same time, the mirror hook lever 36 on the drive lever 32 is biased by the hook lever locking spring 37 counterclockwise in FIG. 7 with the fixed pin 40 as the pivot center. Therefore, the locking boss 35b of the mirror up and down lever 35 engages with the hook portion 36a of the mirror hook lever 36 at this point. However, the pivoting force by the hook portion 36a is not acting on the locking boss 35b at this point.

Figure 8:
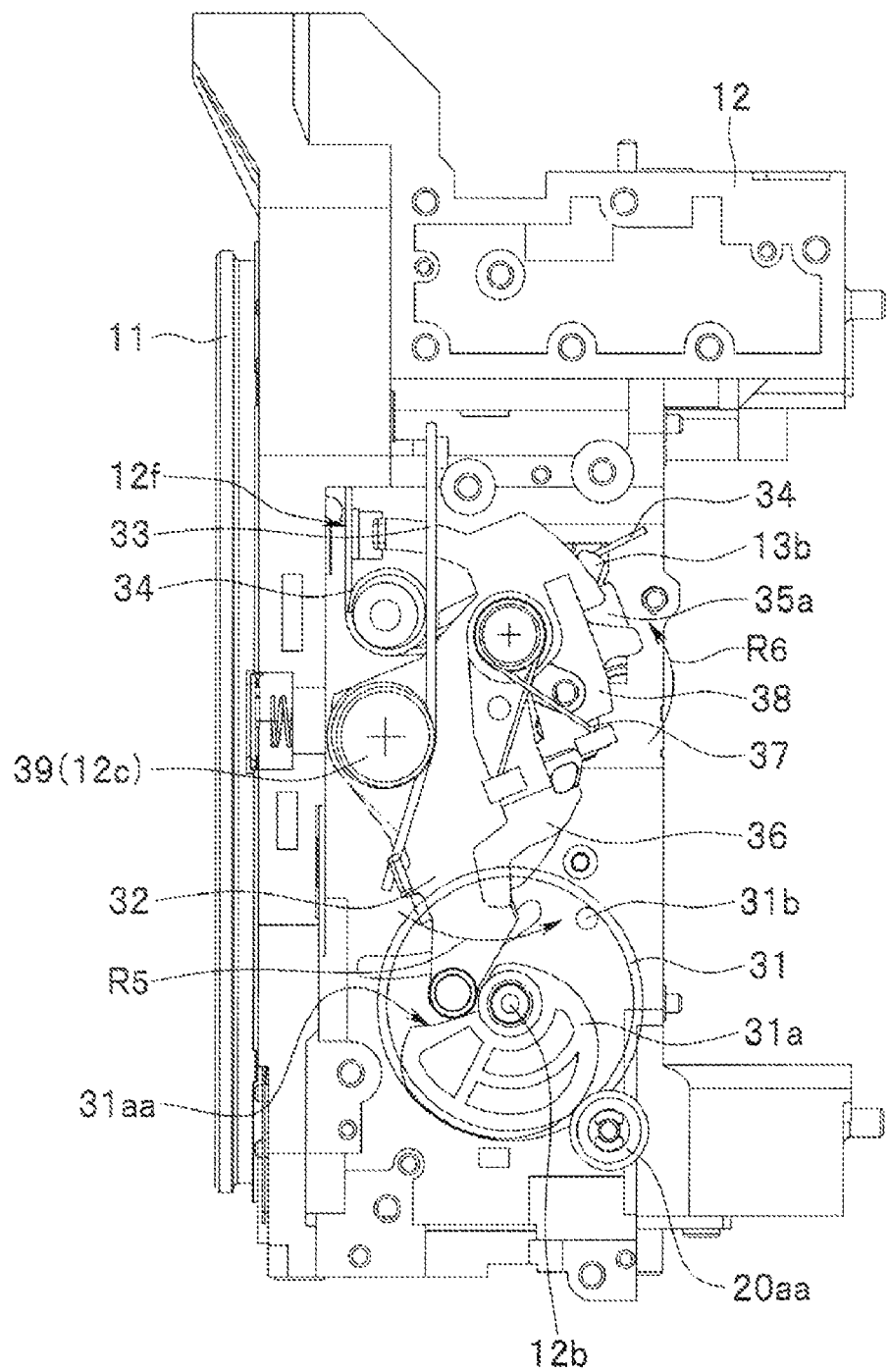
FIG. 8 is a plan view showing a state just after the mirror up operation by the mirror driving device of FIG. 7.

The state shifts to a state shown in FIG. 8 when the charge gear 31 pivots in an arrow R4 direction of FIG. 7 (clockwise in FIG. 7) with the support shaft 12b as the pivot center in the mirror down state shown in FIG. 7.

In the state shown in FIG. 8, the cam follower 32a of the drive lever 32 is dropped to a stepped portion 31aa of the cam surface of the cam 31a of the charge gear 31. In this way, the biasing force of the mirror up spring 33 pivots the drive lever 32 in a direction along an arrow R5 of FIG. 8 (counterclockwise in FIG. 8) with the support shaft 12c as the pivot center.

Along with the pivot of the drive lever 32, the hook portion 36a of the mirror hook lever 36 pivots in the same direction as the drive lever 32 (counterclockwise in FIG. 8) while maintaining the engagement with the locking boss 35b of the mirror up and down lever 35.

Therefore, the mirror up and down lever 35 also pivots in a direction along the arrow R5 of FIG. 8 (counterclockwise in FIG. 8) with the support shaft 12c as the pivot center. The mirror driving rod 13b of the main mirror 13 abuts the lever portion 35a of the mirror up and down lever 35 by the biasing force of the mirror down spring 34. Thus, when the mirror up and down lever 35 pivots in the direction along the arrow R5 of FIG. 8 (counterclockwise in FIG. 8) as described above, the lever portion 35a pivots in a direction along an arrow R6 of FIG. 8 (i.e., in the same direction). In this way, the lever portion 35a raises the main mirror 13 in the up direction through the mirror driving rod 13b against the biasing force of the mirror down spring 34. The biasing force of the mirror up spring 33 is set stronger than the biasing force of the mirror down spring 34. As the main mirror 13 is displaced to the mirror up state, the sub mirror 14 is also displaced to the mirror up state. Thus, the mirrors 13 and 14 of the mirror device 2 are displaced to the retraction positions (reference numerals 13a and 14a) shown with two-dot chain lines of FIG. 1. The state of the mirror device 2 at this point will be called a mirror up state.

The mirror up state is maintained while the power transmission mechanism in the mirror driving device 10 is in the state shown in FIG. 8, i.e., while the hook portion 36a of the mirror hook lever 36 and the locking boss 35b of the mirror up and down lever 35 maintain the engagement. The state shifts to a state shown in FIG. 9 when the charge gear 31 further pivots counterclockwise in FIG. 8 from the mirror up state of FIG. 8 with the support shaft 12b as the pivot center.

Figure 9:
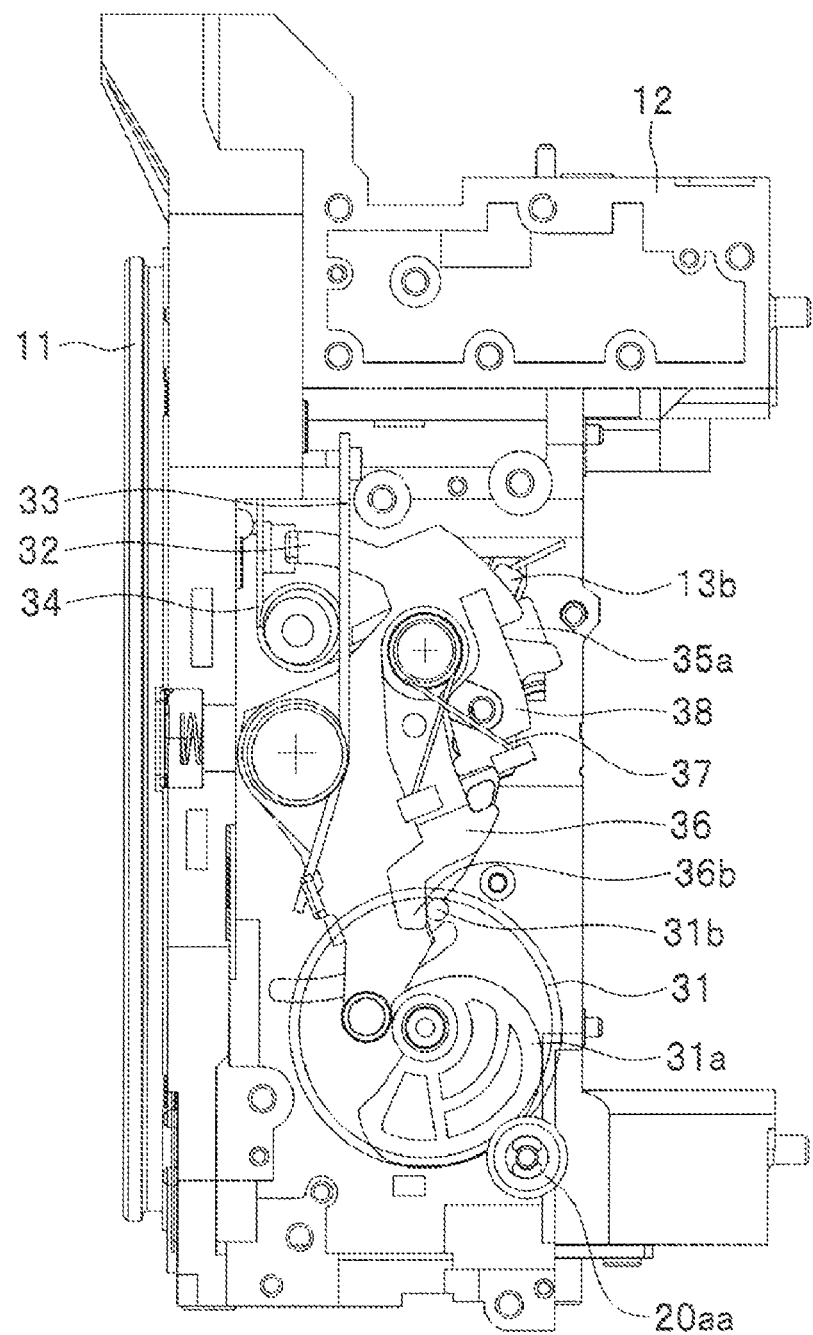
FIG. 9 is a plan view showing a state just before a mirror down operation by the mirror driving device of FIG. 7.

In the state shown in FIG. 9, as the charge gear 31 slightly pivots counterclockwise in FIG. 8 from the state of FIG. 8, the hook release boss 31b of the charge gear 31 moves in a predetermined trajectory and abuts the cam follower 36b of the mirror hook lever 36. There is no change in other members.

Figure 10:
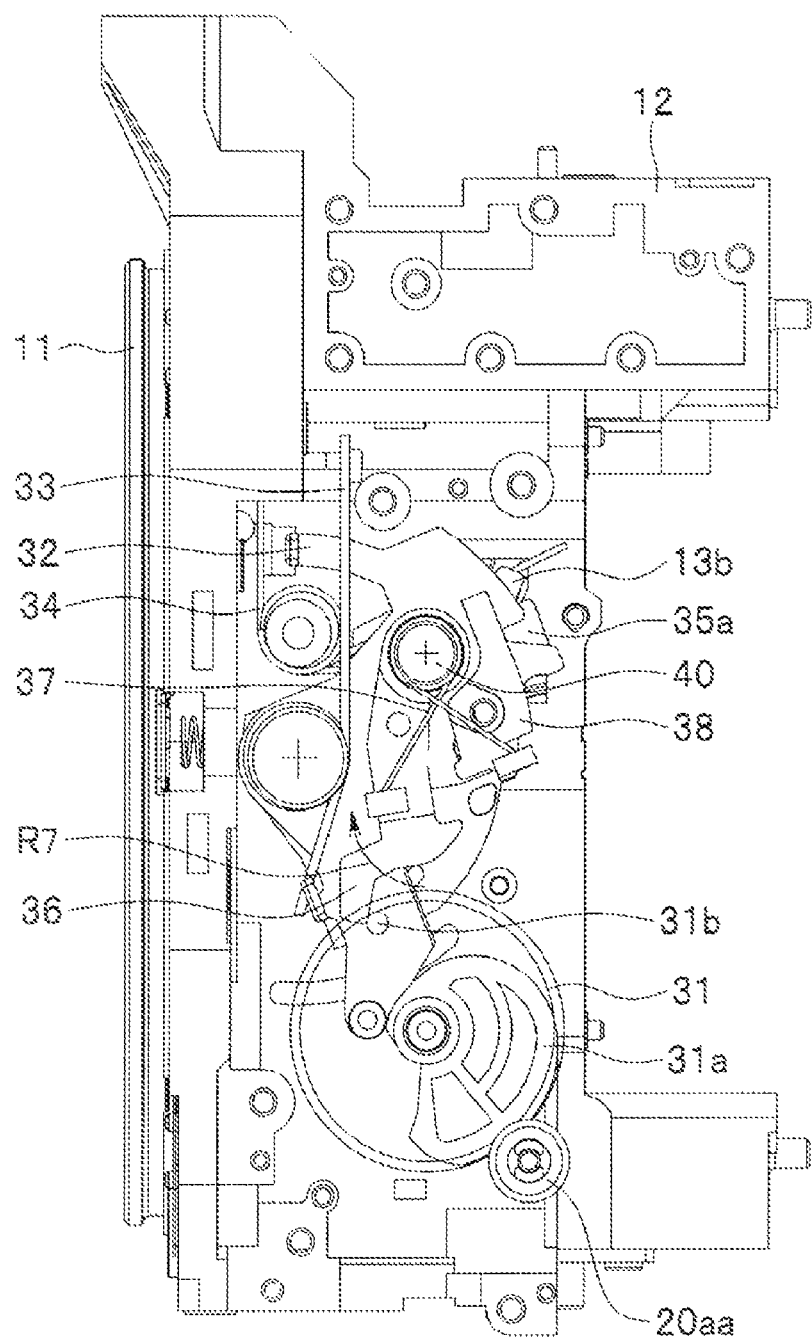
FIG. 10 is a plan view showing a state just after a hook release during the mirror down operation by the mirror driving device of FIG. 7.

The state shifts to a state of FIG. 10 when the charge gear 31 further pivots counterclockwise in FIG. 9 from the state of FIG. 9.

In the state shown in FIG. 10, as the charge gear 31 slightly pivots counterclockwise in FIG. 9 from the state of FIG. 9, the hook release boss 31b of the charge gear 31 presses the cam follower 36b of the mirror hook lever 36. Consequently, the mirror hook lever 36 slightly pivots in a direction along an arrow R7 of FIG. 10 (clockwise in FIG. 10) with the fixed pin 40 as the pivot center against the biasing force of the hook lever locking spring 37.

As a result, the engagement between the hook portion 36a of the mirror hook lever 36 and the locking boss 35b of the mirror up and down lever 35 is released. FIG. 10 shows a state just after the release of the engagement of the two.

Figure 11:
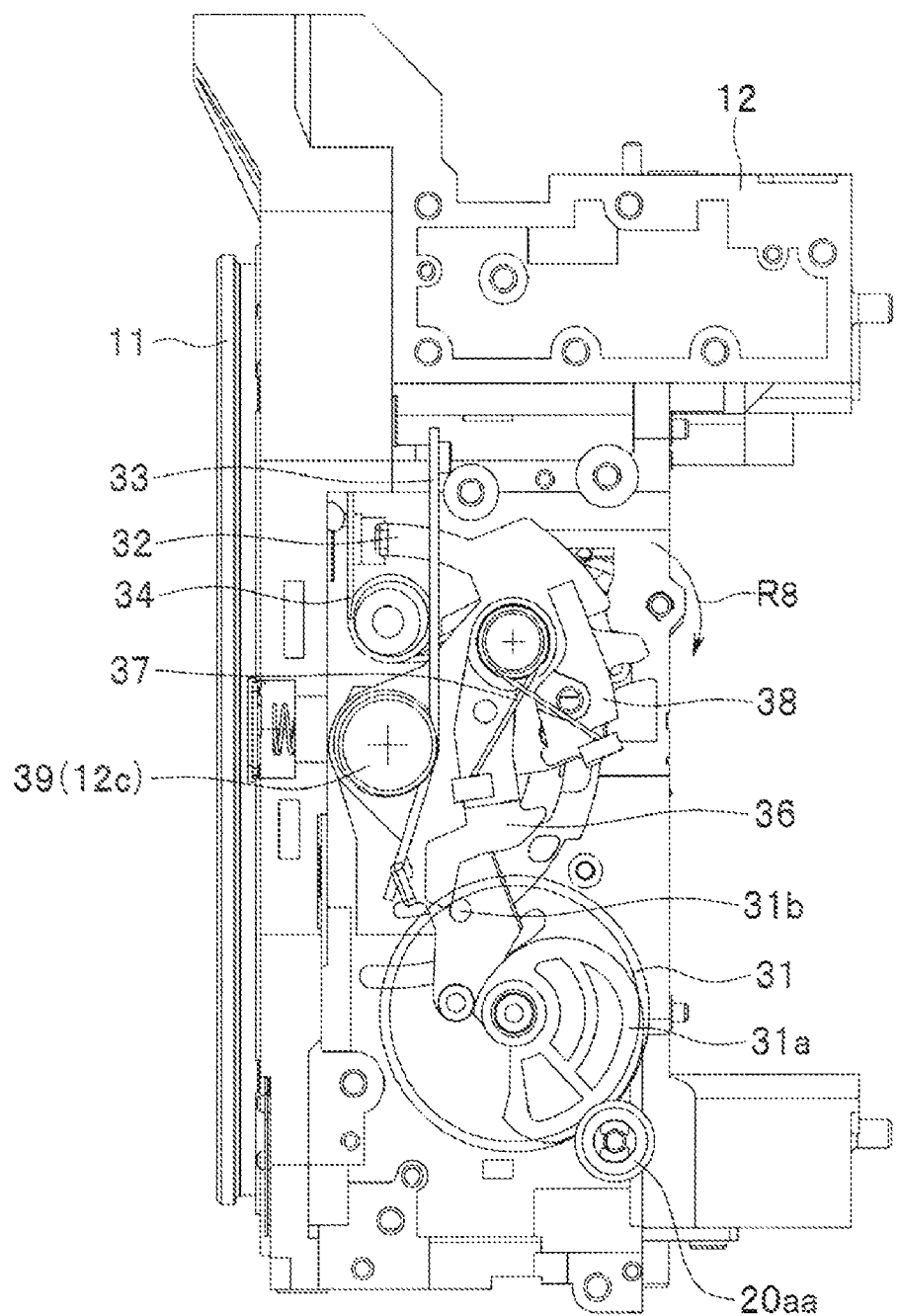
FIG. 11 is a plan view showing a state just after the mirror down operation by the mirror driving device of FIG. 7 and just before the start of a shutter charge operation.

When the engagement between the hook portion 36a and the locking boss 35b is released as described above and the state of FIG. 10 shifts to a state of FIG. 11, the mirror up and down lever 35 pivots, at the same time as the release action, in a direction along an arrow R8 of FIG. 11 (clockwise in FIG. 11) with the support shaft 12c as the pivot center. The mirror driving rod 13b of the main mirror 13 is lowered in the down direction by the biasing force of the mirror down spring 34. This displaces the main mirror 13 to the mirror down state. At the same time, the sub mirror 14 is also displaced to the mirror down state. The mirrors 13 and 14 of the mirror device 2 are displaced to the observation positions (reference numerals 13 and 14) shown with the solid lines in FIG. 1, and the mirror device 2 returns to the mirror down state.

As the charge gear 31 further pivots counterclockwise from the state of FIG. 11, a shutter charge operation starts.

More specifically, when the charge gear 31 pivots counterclockwise in the state of FIG. 1, the cam 31a of the charge gear 31 acts on the cam follower 32a of the drive lever 32 and pivots the drive lever 32 clockwise in FIG. 11 with the support shaft 12c as the pivot center. As a result, the shutter charge lever 38 integrally fixed on the drive lever 32 also pivots in the same direction with the drive lever 32. In this way, the shutter charge portion 38a of the shutter charge lever 38 moves in a direction along the arrow R8 of FIG. 11. The shutter charge portion 38a is designed to press the shutter set lever 15a of the shutter device 15 (not shown in FIG. 11, see FIGS. 4 and 5), and the movement of the shutter charge portion 38a drives the shutter set lever 15a in the charge direction (downward direction in the present embodiment). Consequently, with the pivot of the charge gear 31, the drive lever 32 turns to the state of FIG. 8, i.e. the mirror device 2 turns to the mirror down state, and the shutter charging of the shutter controlling mechanism of the shutter device 15 is completed.

Similar operations will be appropriately performed at predetermined timing as described above after the state of FIG. 8.

As described, according to the embodiment above, the cam 31a of the charge gear 31 directly drives the drive lever 32 as a constituent member of the mirror driving device 10 for performing the up and down drive of the main mirror 13 of the mirror device 2. During the series of operations, the shutter charge portion 38a of the shutter charge lever 38 arranged integrally with the drive lever 32 appropriately acts on the shutter set lever 15a. Therefore, the shutter charge drive can be simultaneously and directly performed during the execution of the up and down drive of the mirror.

The constituent members of the mirror driving device 10 for raising and lowering the main mirror 13 and for performing the shutter charge drive are installed on one of the outer walls of the side plate 12a of the mirror box 12. The mirror driving device 10 is arranged to be housed in a narrow space between the mirror box 12 and the shutter device 15, specifically, between the side plate 12a of the mirror box 12 and the controlling mechanism of the shutter device 15. Therefore, the internal space of the camera 1 can be effectively used, thereby contributing to the miniaturization of the camera 1 itself.

To displace the main mirror 13 of the mirror device 2 from the mirror up state to the mirror down state, the engagement of the mirror hook lever 36 at a position for maintaining the mirror up state of the main mirror 13 is released. In this case, the operation for releasing the engagement of the mirror hook lever 36 is designed to be able to be directly performed by the hook release boss 31b arranged on the charge gear 31. Therefore, the mirror down state of the mirror device 2 in the mirror up state can be easily restored without a complicated mechanism.

As the charge gear 31 includes the cam of the cam 31a and the hook release boss 31b, the charge gear 31 can perform the mirror charge, the shutter charge, the mirror up, and the mirror down with the pivot of the charge gear 31 only, thereby contributing to the miniaturization of the camera without using excessive components or actuators.

It is obvious that the present invention is not limited to the embodiments described above, but is capable of implementing various modifications and applications without departing from the scope of the invention. The embodiments described above include various stages of the invention, and various inventions can be extracted by appropriately combining the plurality of disclosed constituent features. For example, even if some of the constituent features disclosed in one embodiment described above are deleted, the configuration in which the constituent features are deleted is extracted as an invention if the problem described in the section of problems to be solved by the invention can be solved and the advantages described in advantages of the invention can be obtained.

The present invention is not to be limited by specific embodiments except as limited by the appended claims.

What is claimed is:

1. A single-lens reflex camera including a mirror driving device comprising:

a movable reflective mirror;

a first biasing spring that provides pivot and bias for lowering the movable reflective mirror;

a drive lever arranged parallel to a side plate of a mirror box and arranged reciprocably pivotable along the side plate to perform a shutter charge drive and an up and down drive of the movable reflective mirror;

a second biasing spring that pivots and biases the drive lever in a direction in which the movable reflective mirror goes up;

a locking lever arranged parallel to the side plate and swingable with a pivoting shaft as the pivot center, the pivoting shaft being arranged on the drive lever;

a mirror up and down lever arranged parallel to the side plate, arranged reciprocably pivotable along with the pivot of the drive lever, engaged with the locking lever when raising the movable reflective mirror, the mirror up and down lever pivoting with the drive lever to raise the movable reflective mirror with the biasing force of the second biasing spring against the biasing force of the first biasing spring, the mirror up and down lever releasing the engagement with the locking lever when lowering the movable reflective mirror, and the mirror up and down lever pivoting in the direction opposite the pivot direction of when raising the movable reflective mirror with the biasing force of the first biasing spring to lower the movable reflective mirror;

a locking spring that biases in a direction in which the locking lever engages with the mirror up and down lever;

a charge gear that includes a charge cam for pivoting the drive lever in the shutter charge direction while maintaining the down state of the movable reflective mirror against the biasing force of the second biasing spring and a release boss for releasing the engagement between the locking lever and the mirror up and down lever and that pivots parallel to the side plate;

a drive motor for driving the charge gear, the drive motor being arranged outside the side of the controlling mechanism of the shutter device; and a gear box provided between the charge gear and the drive motor, the gear box driving the charge gear directly.

2. The single-lens reflex camera including the mirror driving device according to claim 1, further comprising:

a focal plane shutter device, wherein
the mirror driving device is arranged so as to be interposed between a controlling mechanism of the shutter device and the side plate.

3. The single-lens reflex camera including the mirror driving device according to claim 1, wherein the drive motor and the gear box are unitized to form a single unit.

4. The single-lens reflex camera including the mirror driving device according to claim 1 further comprising:

a first support shaft projecting from the side plate and defining a first axis of rotation; and a second support shaft projecting from the side plate and defining a second axis of rotation, wherein the second axis of rotation is parallel with the first axis of rotation.

5. The single-lens reflex camera according to claim 4, wherein the first support shaft supports at least one gear.

6. The single-lens reflex camera according to claim 4, wherein the second support shaft supports at least one lever and at least one spring.

7. The single-lens reflex camera according to claim 4, wherein the drive motor drives the moveable reflecting mirror by driving the charge gear, the first biasing spring, the second biasing spring, the drive lever, the mirror up and down lever, and the locking lever, wherein the charge gear rotates around the first support shaft, and wherein the second biasing spring, the drive lever, and the mirror up and down lever rotate around the second support shaft.

* * * * *